(12) United States Patent
Dharmadhikari et al.

(10) Patent No.: US 12,215,673 B2
(45) Date of Patent: Feb. 4, 2025

(54) SYSTEM COMPRISING A STRUCTURE BEING PRONE TO LIGHTNING STRIKES AND ICING, A METHOD FOR OPERATING THE SYSTEM AND A WIND TURBINE COMPRISING THE SYSTEM

(71) Applicant: General Electric Renovables Espana, S.L., Barcelona (ES)

(72) Inventors: Parag Rameshchandra Dharmadhikari, Garching b. Müchen (DE); Stephan Klümper, Salzbergen (DE); Victor Miranda, Kolding (DK); Werner Gerhard Barton, Salzbergen (DE)

(73) Assignee: General Electric Renovables España S.L., Barcelona (ES)

( * ) Notice: Subject to any disclaimer, the term of this patent is extended or adjusted under 35 U.S.C. 154(b) by 0 days.

(21) Appl. No.: 17/887,858

(22) Filed: Aug. 15, 2022

(65) Prior Publication Data

US 2023/0067244 A1   Mar. 2, 2023

(30) Foreign Application Priority Data

Aug. 16, 2021   (EP) .................................... 21191506

(51) Int. Cl.
  *F03D 80/40*   (2016.01)
  *B64D 15/12*   (2006.01)
  (Continued)

(52) U.S. Cl.
  CPC ............. *F03D 80/40* (2016.05); *B64D 15/12* (2013.01); *F03D 17/00* (2016.05); *F03D 17/002* (2023.08);
  (Continued)

(58) Field of Classification Search
  CPC ................................ B64D 15/12; B64D 15/14
  See application file for complete search history.

(56) References Cited

U.S. PATENT DOCUMENTS 3,800,121 A * 3/1974 Dean ...................... H05B 3/283
                                                              219/202
5,361,183 A * 11/1994 Wiese ...................... H05B 3/36
                                                              361/42

(Continued)

FOREIGN PATENT DOCUMENTS

CN          210068398 U  *  2/2020
DE       102007059502 B3     3/2009
(Continued)

OTHER PUBLICATIONS

English translation of KR101422707B1 (Year: 2014).*

(Continued)

*Primary Examiner* — Woody A Lee, Jr.
*Assistant Examiner* — Wesley Le Fisher
(74) *Attorney, Agent, or Firm* — Dority & Manning, P.A.

(57) ABSTRACT

The present disclosure is directed to a system comprising a structure being prone to lightning strikes and icing, wherein the structure comprises a shielding arrangement electrically connected to a lightning arrangement, an electric heating arrangement connected to a power source for mitigating icing of the structure, and an electrical insulation arrangement being effectively provided between the shielding arrangement and the electric heating arrangement. A power source is configured for applying a predetermined amount of electric test- and/or maintenance-energy such that the electric test- and/or maintenance-energy is effectively present between the shielding arrangement and the electric heating arrangement. A determination device is electrically connected to the shielding arrangement and to the electric heating arrangement in a way that the shield-heating-voltage (Continued)

and/or the shield-heating-current being present between the shielding arrangement and the electric heating arrangement can be determined.

7 Claims, 4 Drawing Sheets

(51) Int. Cl.
  *F03D 17/00* (2016.01)
  *F03D 80/30* (2016.01)
  *F03D 80/50* (2016.01)
(52) U.S. Cl.
  CPC ......... *F03D 17/014* (2023.08); *F03D 80/30* (2016.05); *F03D 80/401* (2023.08); *F03D 80/50* (2016.05); *F05B 2260/20* (2013.01); *F05B 2260/80* (2013.01)

(56) References Cited

U.S. PATENT DOCUMENTS

| | | | | |
|---|---|---|---|---|
| 5,925,275 | A * | 7/1999 | Lawson | B64D 15/12 219/543 |
| 6,612,810 | B1 * | 9/2003 | Olsen | F03D 80/40 415/908 |
| 7,896,616 | B2 * | 3/2011 | Livingston | F03D 80/40 416/224 |
| 8,342,743 | B2 | 1/2013 | Aderhold | |
| 8,853,233 | B2 | 10/2014 | Pisano et al. | |
| 8,931,740 | B2 * | 1/2015 | Nordin | B64C 3/26 244/134 R |
| 9,341,164 | B2 * | 5/2016 | Lind | F03D 80/40 |
| 9,395,337 | B2 | 7/2016 | Newman | |
| 9,562,870 | B2 | 2/2017 | Bouteyre et al. | |
| 9,797,381 | B2 * | 10/2017 | Iriarte Eleta | F03D 80/40 |
| 11,396,864 | B2 * | 7/2022 | Buggy | F03D 17/00 |
| 2015/0204311 | A1 * | 7/2015 | Clemens | H01T 4/02 219/539 |
| 2019/0112054 | A1 * | 4/2019 | Zhao | B64D 15/12 |
| 2019/0153995 | A1 | 5/2019 | Tobin et al. | |
| 2020/0300226 | A1 * | 9/2020 | Buggy | F03D 80/40 |
| 2022/0243703 | A1 * | 8/2022 | Spandley | G01M 5/0016 |
| 2022/0243704 | A1 * | 8/2022 | March Nomen | F03D 80/30 |
| 2024/0309853 | A1 * | 9/2024 | Niskanen | F03D 80/301 |

FOREIGN PATENT DOCUMENTS

| | | |
|---|---|---|
| EP | 2984337 B1 | 2/2018 |
| KR | 101422707 B1 * | 7/2014 |
| WO | WO2021023350 A1 | 2/2021 |

OTHER PUBLICATIONS

English translation of CN210068398U (Year: 2020).*
European Search Report Corresponding to EP21191506 on Jan. 24, 2022.
Basu et al., Self-Healing Electrical Insulation Systems, 2016 IEEE International Conference on Dielectrics (ICD), 2016, pp. 435-438. (Abstract Only) https://ieeexplore.ieee.org/abstract/document/7547636.
Intertek, Denmark Contact Information, 1 Page. http://www.intertek.com/contact/ema/denmark/.
Intertek, Spain Contact Information, 8 Pages. http://www.intertek.com/contact/ema/spain/.
Lesaint et al., Self-Healing High Voltage Electrical Insulation Materials, 2014 IEEE Electrical Insulation Conference (EIC), 2014, pp. 241-244. (Abstract Only) https://ieeexplore.ieee.org/abstract/document/6869384.
Yang et al., Self-Healing of Electrical Damage in Polymers, Advanced Science, vol. 7, Issue 21, 2002131, Nov. 4, 2020, 21 Pages. https://onlinelibrary.wiley.com/doi/full/10.1002/advs.202002131.

* cited by examiner

SYSTEM COMPRISING A STRUCTURE BEING PRONE TO LIGHTNING STRIKES AND ICING, A METHOD FOR OPERATING THE SYSTEM AND A WIND TURBINE COMPRISING THE SYSTEM

FIELD

The present subject matter relates generally to a system comprising a structure being prone to lightning strikes and icing. More specifically, the subject matter refers to rotor blades for wind turbines, wherein counter-measures against a generation of ice on surfaces either of the system or of a rotor blade, in particular which is operated in sub-zero regions, are to be provided while ensuring a specific protection against harm caused by lightning strikes.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

The development of layer of ice on a surface of a rotor blade negatively influences the performance of the respective wind turbine such, that an overall energy production is reduced. Furthermore, ice being present on a rotating rotor blade may as well cause additional loads and/or rotational imbalance, which subsequently may require a reduction of power generation and/or may result in a reduction of the lifetime of the wind turbine.

In the past, several possible solutions were implemented in order to prevent generation of ice on surfaces of rotor blades. For example, wind turbines were equipped with hot air blowing arrangements which produce a hot stream of air being directed into an interior volume of rotor blades. This led to an overall heating of the respective rotor blade causing ice present on an exterior surface of the rotor blade to melt and subsequently to fall off the rotor blade. As an alternative, electric heating arrangements including carbon heating mats were applied to a skin of a rotor blade. The latter may cause an increased effort during manufacturing, in particular since its functionality depend specifically on high-quality manufacturing standards and quality of used materials.

A rotor blade of a wind turbine or a general structure being prone to icing may as well be negatively affected by lightning strikes. Specifically, a functionality of an electric heating arrangement in the structure or rotor blade may be destroyed by the electrical consequences of a lightning strike.

Accordingly, the present disclosure is directed to a structure being prone to lightning strikes and icing, specifically to a rotor blade of a wind turbine, having improved operational and manufacturing characteristics. In addition, the present disclosure is directed to a method for operating such a system and to a wind turbine having such type of rotor blade.

BRIEF DESCRIPTION

Aspects and advantages of the invention will be set forth in part in the following description, or may be obvious from the description, or may be learned through practice of the invention.

In one aspect, the present disclosure is directed to a system according to claim 1, in particular comprising a structure being prone to lightning strikes and icing, wherein the structure comprises a shielding arrangement electrically connected to a lightning arrangement, an electric heating arrangement connected to a power source for mitigating icing of the structure, and an electrical insulation arrangement being effectively provided between the shielding arrangement and the electric heating arrangement.

The power source is configured for applying a predetermined amount of electric test- and/or maintenance-energy such that the electric test- and/or maintenance-energy is effectively present between the shielding arrangement and the electric heating arrangement. For example, the electric test- and/or maintenance-energy is provided to the shielding arrangement and to the electric heating arrangement such that as a consequence a shield-heating-voltage is applied effectively between the shielding arrangement and the electric heating arrangement. Furthermore, —if the system is in a suitable condition—, as a consequence of the provision of the electric test- and/or maintenance-energy, a shield-heating-current flows between the shielding arrangement and the electric heating arrangement, or vice versa. Hence, the shield-heating-voltage and the shield-heating-current are caused by the provision of the predetermined electric test- and/or maintenance-energy.

According to an optional detail of the aspect, the term "electric test- and/or maintenance-energy" may reflect or is reflecting a specific and distinguishable amount and/or quality of electric energy in order to examine and ensure a functionality of the system. In particular, the electric test- an/or maintenance-energy is distinguishable from an electric operating energy for operating the electric heating arrangement. For example, the electric test- an/or maintenance-energy is different from the electric operating energy in terms of voltage and/or electric current.

A determination device can be electrically connected to the shielding arrangement and to the electric heating arrangement in a way that the shield-heating-voltage and/or the shield-heating-current being present between the shielding arrangement and the electric heating arrangement can be determined. According to an embodiment, the determination device can be a measurement device having a specific sensors, which can be embodied as a specific component, which can be integrated in the power source and/or in the controller of the wind turbine.

It may be noticed that the term "shield-heating-current is present between the shielding arrangement and the electric heating arrangement" refers to the fact that the shield-heating-current is flowing between the shielding arrangement and the electric heating arrangement, thus, describing an instantaneous moment of a current specific measurement. Further it is to be noted that the term "can be determined" includes direct measurements or indirect determinations by analyzing further available "measurement" values.

The system as described enables the following functionalities, in particular if the power source is controlled accordingly:

According to a first operational embodiment the shield-heating-voltage is applied between the shielding arrangement and the electric heating arrangement while the shieldheating-current is limited to at least one shield-heating-current threshold; this first operational embodiment represents a test cycle of the shielding functionality of the shielding arrangement, wherein a level of protection (a functionality of protection) of the electric heating arrangement from overvoltage or surge can be determined. For example, while keeping the shield-heating-current within its limits and below the shield-heating-current threshold a specific maximum shield-heating-voltage (e.g. 5 kV) is to be established between the shielding arrangement and the electric heating arrangement. By this it is ensured that up to the shield-heating-voltage threshold an electrical separation (e.g. insulation) between the shielding arrangement and the electric heating arrangement is functionally effective and ensured. Therefore, when the system is hit by a lightning bolt, a damage of the electric heating arrangement can be prevented since the electric protection for the electric heating arrangement provided by the shielding arrangement is functional. Said functionality is insured as long as a voltage induced into the shield arrangement by the lightning bolt does not exceed the shield-heating-voltage threshold.

According to a second operational embodiment a predetermined amount and/or type of the shield-heating-current (electric flow) can be established between the shielding arrangement and the electric heating arrangement. This second operational embodiment represents a repair cycle for the system in order to provide an insulating functionality between the shielding arrangement and the electric heating arrangement such that the insulation functionality is effective up to the shield-heating-voltage threshold.

By performing the test cycle (first operational embodiment) it can be determined, if the shielding arrangement is not sufficiently insulated with respect to the electric heating arrangement. For example, an insufficient insulation may be caused by a conductivity already present between the shielding arrangement and the electrical heating arrangement or may be being formed by an applied shield-heating-voltage (voltage breakthrough). The test cycle may comprise applying a specific shield-heating-voltage between the shielding arrangement and the electric heating arrangement, wherein the shield-heating-voltage is increased up to a predetermined shield-heating-voltage threshold. If the shield-heating-voltage up to a shield-heating-voltage threshold cannot be established between the shielding arrangement and the electric heating arrangement while keeping the shield-heating-current under the shield-heating-current threshold, it is determined that the insulation functionality between the shielding arrangement and the electric heating arrangement is insufficient.

If an insufficient insulation functionality is determined, the repair cycle (second operational embodiment) may be applied: a predetermined amount and/or type of the shield-heating-current is established between the shielding arrangement and the electric heating arrangement. Said establishing of the shield-heating-current is possible due to the insufficient insulation functionality. The amount and/or type of the shield-heating-current is chosen such that the conductivity between the shielding arrangement and the electric heating arrangement is rendered ineffective, for example, by overloading and therefore overheating an electric path of the conductivity. Possibly, the predetermined amount and/or type of the shield-heating-current is chosen according to the amount of the detected conductivity.

The first and the second operational embodiments can both be established by the provided system by controlling the power source and/or the determination device accordingly.

According to an embodiment, the system further comprises a controller configured for controlling the power source and/or the determination device such that the first operational embodiment and/or the second operational embodiment can be established. The controller may be realized by a specific controller for the system or by a general system controller. For example, if the structure of the system is a rotor blade of a wind turbine, a specific rotor blade controller or a general wind turbine controller of the wind turbine carrying the rotor blade can be used for implementing the first embodiment (test cycle) and/or the second operational embodiment (repair cycle).

According to an embodiment, the system comprises the lightning arrangement having a lightning receptor, a grounding device being effectively connectable with a grounding arrangement, and conductive means which are connecting the lightning receptor with the grounding device, in particular wherein the lightning arrangement is electrically connected with the determination device.

According to a further embodiment, the structure is configured as a rotor blade for a wind turbine. In particular, in this case, the system can be identified as a rotor blade system comprising at least one rotor blade per se, the lightning receptor, a grounding device being effectively connectable with a grounding arrangement of a wind turbine or of a hub of the wind turbine, and conductive means which are connecting the lightning receptor with the grounding device, in particular wherein the lightning arrangement is electrically connected with the determination device. Furthermore, the shielding arrangement may comprise a shielding layer, for example comprising a copper mesh, wherein the shielding arrangement is connected to the conductive means via a shielding conductor.

The rotor blade may comprise a root section having a blade root, a tip section having a blade tip, a middle section connecting the root section with the tip section, and a blade skin forming a suction surface and a pressure surface of the rotor blade.

Furthermore, the rotor blade comprises the electric heating arrangement optionally having at least one or a plurality of heating layers. The electric heating arrangement may have several portions, wherein the heating layer and/or portions of the electric heating arrangement or the entire electric heating arrangement is/are located and/or mounted in/to the rotor blade.

According to an embodiment, the heating arrangement is flexible such that it may perform deformations according deformations of the overall rotor blade or the skin of the rotor blade during operation of the wind turbine, for example, due to bending of the rotor blade in a flap wise direction.

In particular, the heating arrangement is arranged with the blade skin and extends over 50%, in particular over 65%, preferably over 80%, of a total length of the rotor blade in a longitudinal direction of the rotor blade.

Aforementioned configuration and additional details of the design of the heating arrangement are chosen such that the heating arrangement is configured for being capable to reduce an adhesive bonding between ice and an outer surface of the rotor blade by electrically heating a respective surface. The heating arrangement may be embodied as a heating layer and may comprise a plurality of sub-heating layers. The heating layer of the heating arrangement or a respective sub-layer may be laminated within the skin of the rotor blade.

For example, a tailored thickness of a heating layer of the heating arrangement may be embodied according to a socalled "Precisely Controlled Oriented Thickness", in particular for the purpose of providing heating requirements in proportion and/or at various co-ordinates on the blade surface.

In particular, a cross-section of the heating arrangement is not constant in longitudinal direction of the rotor blade, for example, a width and/or thickness of the heating layer at a longitudinal position may be determined depending on a size of the respective chord length at said longitudinal position.

Additionally and/or alternatively, a width and/or thickness of the heating layer at a longitudinal position may be proportional and/or depending to a size of the respective chord length at said longitudinal position. Thus, a width and/or thickness of heating layer located in a longitudinal range of the rotor blade having an increasing chord size in longitudinal direction would as well increase in longitudinal direction and/or a width and/or thickness of the heating layer located in a longitudinal range of the rotor blade having a decreasing chord size in longitudinal direction would as well decrease in longitudinal direction. In this context, a longitudinal direction may be determined as being extending from the blade root toward the blade tip.

Regardless, whether the structure is embodied as a rotor blade of a wind turbine, as a portion of an airplane, or as a portion of another structure being prone to lightning strikes and icing, the structure—according to an embodiment—comprises the following:

At least a partially fiber reinforced portion which is configured as a skin for at least defining an outer shape of the structure, wherein the fiber reinforced portion at least comprises at least one outer layer, at least one inner layer, at least one insulation layer of the insulation arrangement, at least one shielding layer of the shielding arrangement, and at least one heating layer of the electric heating arrangement.

The insulation layer is arranged between the shielding layer and the heating layer, wherein the shielding layer, the insulation layer, and the heating layer are arranged between the outer layer and the inner layer. Furthermore, the shielding layer is arranged closer to the outer layer then the heating layer.

Thus, the at least one heating layer, in particular all heating layers, is/are insulated with respect to the skin. For example, this can be achieved by laminating the heating layer between additional layers of a fiber reinforced material of the skin using a non-conductive, thus, an insulating resin.

According to an embodiment, all layers do not necessarily extend over each other, but that the layers may have different sizes, thus, varying areas of overlapping.

According to an embodiment, the heating arrangement and/or heating layer has/have an overall resistance high enough for sufficiently mitigate ice on the surface of the structure by obtaining a desired energy dissipation into heat. Alternatively or additionally, the heating arrangement has an overall resistance of at least 0.1 Ohm, and/or of not more than 1 Ohm.

According to an embodiment, the heating arrangement is configured for introducing sufficient heat energy into the skin for melting an adhesion of ice and a surface of the skin, for example by inducing more than 10 kW into the respective surface, and/or of not more than 400 kW, in particular not more than 200 kW. For example, the upper limit may depend on a power control system as used, for example continuous heating, On-Off Control, Phase Control, Voltage Control, Pulse Width Modulation, Integral Cycle control or any combination thereof.

According to an embodiment, the heating arrangement is configured for introducing sufficient heat energy into the skin, for example more than 0.1 kW per square meter surface of the blade skin, in particular more than 0.5 kW/m$^2$, preferred more than 1 kW/m$^2$, and/or not more than 20 kW/m$^2$, in particular not more than 10 kW/m$^2$, preferred not more than 3 kW/m$^2$. Said values may depend on the effective area, leading edge, trailing edge, tip section, middle section and/or root section to be covered.

According to an embodiment, the heating layer is embodied as a continuous solid material. The term "continuous material" refers to a material which has essentially no discontinuities or physical intersections, like wholes or cutouts. However, said term may not exclude, that at least a few physical intersections—for example for mounting purposes or electrical connection purposes—are still provided in the continuous material.

According to a further embodiment, the heating layer is configured such that it can be provided as a tape material, for example in rolled-up form. For example, the raw material of the heating layer is a rolled up copper tape or carbon tape, which is easy to carry and/or to handle during manufacturing.

According to an embodiment, the insulation arrangement and/or the insulation layer is/are at least partially made from a self-healing material.

The term "self-healing material" is to be construed as a material which is capable of repairing minor damages when being subjected to a specific external condition. Such external condition must be different from any possible operating condition. For example, such external condition can be a specific temperature, possibly caused by establishing a specific electrical current through the very location comprising the minor damage.

For example, the self-healing material is configured such that, when performing the repair cycle, a conductivity being present between the shielding arrangement and the heating arrangement can be rendered ineffective, for example by melting a portion of the self-healing material due to a heating effect of the shield-heating-current.

According to an aspect of the invention, a method for operating a system according to any of the preceding embodiments, or according to a plurality or a combination thereof, is disclosed. In particular, the method is configured such that steps are provided suitable for performing the first operational embodiment (test cycle) and/or the second operational embodiment (repair cycle).

In particular, the method comprises the following steps: applying, via the power source, a predetermined amount of an electric test- and/or maintenance-energy between the shielding arrangement and the electric heating arrangement, applying the shield-heating-voltage between the shielding arrangement and the electric heating arrangement while the shield-heating-current is limited to at least one maintenance current threshold, and/or establishing a predetermined amount of the shield-heating-current between the shielding arrangement and the electric heating arrangement.

Test cycle: According to an embodiment, the step of applying the shield-heating-voltage between the shielding arrangement and the electric heating arrangement is configured such that a test of a conductivity between the shielding arrangement and the electric heating arrangement is performed (first operational embodiment, test cycle).

According to a specific embodiment of the preceding embodiment, the shield-heating-voltage is representing a test voltage, wherein the method comprises the following additional steps:

applying the test voltage between the shielding arrangement and the electric heating arrangement, determining the shield-heating-current, if the measured shield-heating-current does not exceed the shield-heating-current threshold while applying the test voltage, it is determined that a test of a conductivity between the shielding arrangement and the electric heating arrangement has been successfully passed. By applying the preceding specific steps, the first operational embodiment is provided by performing the test cycle.

According to a specific embodiment of the test cycle, the predetermined shield-heating-voltage comprises a plurality of increasing test voltages, wherein the method is comprising additional steps:

defining a test voltage threshold, e.g. 5 kV, applying the plurality of increasing test voltages up to reaching the test voltage threshold, determine the shield-heating-current, and, if the plurality of increasing test voltages has been applied and the measured shield-heating-current does not exceed the shield-heating-current threshold, it is determined that the test has been successfully passed.

According to an embodiment, the method may comprise the additional steps of defining plurality of shield-heating-current thresholds having at least a minimum shield-heating-current threshold and a maximum shield-heating-current threshold, and repeatedly executing the method according to any of the precedingly described test cycle (first operational embodiment) while applying each shield-heating-current threshold of the plurality of shield-heating-current thresholds in each execution of the test cycle, in particular starting with the minimum shield-heating-current threshold until the maximum shield-heating-current threshold is reached.

Repair cycle: according to an embodiment of the described method (second operational embodiment), wherein the step of establishing a predetermined amount of the shield-heating-current between the shielding arrangement and the electric heating arrangement is configured such that a conductivity between the shielding arrangement and the electric heating arrangement is reduced. For example, the presence of the shield-heating-current results in diffusing the electrical connection between the shielding and the heating layer, in particular by heating up the material in the environment of the conductivity.

According to a specific embodiment, the shield-heating-current is an electric repair current, wherein the electric repair current exceeds a certain minimum electric repair current threshold and/or does not exceed a certain maximum electric repair current threshold. The method is further comprising the steps of establishing the electric repair current between the shielding arrangement and the electric heating arrangement.

According to an embodiment, the first operational embodiment (test cycle) and the second operational embodiment (repair cycle) may be combined and/or integrated such, that in a first step, if the test of a conductivity according to any of the embodiments of the test cycle is not passed, the method according to the repair cycle is performed.

According to an additional aspect, a rotor for a wind turbine is disclosed, wherein the rotor comprises a rotatable hub and at least one rotor blade according to one or a plurality of the precedingly described embodiments. The rotor blade is rotatably mounted to the hub, wherein the hub comprises a pitch assembly for rotating the rotor blade about a pitch axis of the rotor blade.

In another aspect, the present disclosure is directed to a wind turbine comprising a rotor according to one of the preceding embodiments of a rotor for a wind turbine.

Additionally or alternatively, a wind turbine is disclosed, wherein the wind turbine is comprising a rotatable hub being connected to an electric generator such that the electrical generator can be rotated by the rotor and generate electrical energy thereof, and a system according to any of the preceding embodiments of the system, wherein the structure is configured as a rotor blade rotatably mounted to the hub, and wherein the controller is configured for performing the method according to the first operational embodiment (test cycle) and/or to the second operational embodiment (repair cycle).

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Single features depicted in the figures are shown relatively with regards to each other and therefore are not necessarily to scale. Similar or same elements in the figures, even if displayed in different embodiments, are represented with the same reference numbers.

DETAILED DESCRIPTION OF THE INVENTION

Figure 1:
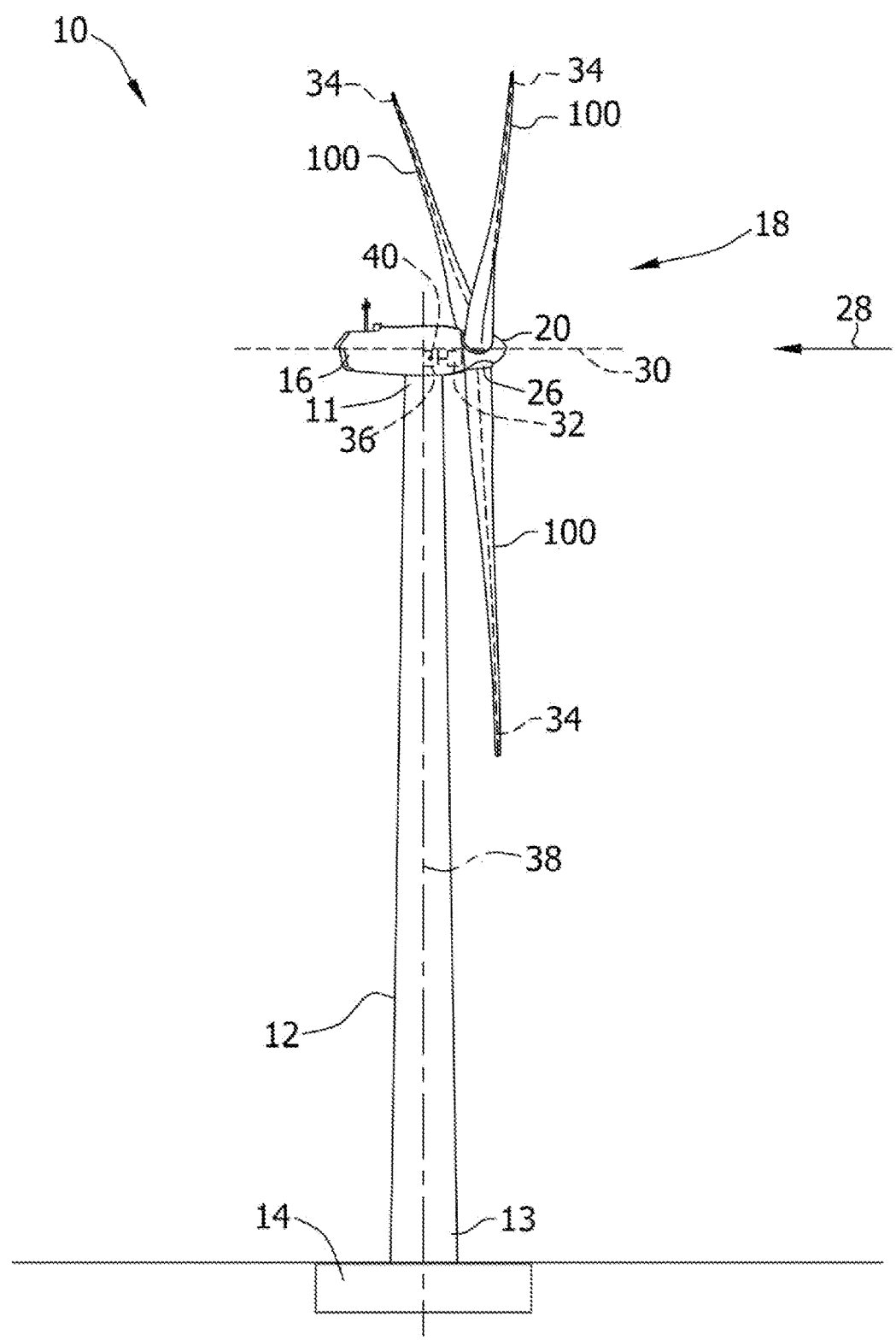
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, which shall not limit the invention. In fact, it will be apparent to those skilled in the art that various modifications and variations can be made in the present invention without departing from the scope or spirit of the invention, for instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of an exemplary wind turbine 10. In the exemplary embodiment, the wind turbine 10 is a horizontal-axis wind turbine. Alternatively, the wind turbine 10 may be a vertical-axis wind turbine. In the exemplary embodiment, the wind turbine 10 includes a tower 12 that extends from a support system 14, a nacelle 16 mounted on tower 12, and a rotor 18 that is coupled to nacelle 16. The rotor 18 includes a rotatable hub 20 and at least one rotor blade 100 coupled to and extending outward from the hub 20. In the exemplary embodiment, the rotor 18 has three rotor blades 100. In an alternative embodiment, the rotor 18 includes more or less than three rotor blades 100. In the exemplary embodiment, the tower 12 is fabricated from tubular steel to define a cavity (not shown in FIG. 1) between a support system 14 and the nacelle 16. In an alternative embodiment, the tower 12 is any suitable type of a tower having any suitable height.

The rotor blades 100 are spaced about the hub 20 to facilitate rotating the rotor 18 to enable kinetic energy to be transferred from the wind into usable mechanical energy, and subsequently, electrical energy. The rotor blades 100 are mated to the hub 20 by coupling a root section 110 to the hub 20 at a plurality of load transfer regions 26. The load transfer regions 26 may have a hub load transfer region and a blade load transfer region (both not shown in FIG. 1). Loads induced to the rotor blades 100 are transferred to the hub 20 via the load transfer regions 26.

In one embodiment, the rotor blades 100 have a length ranging from about 15 meters (m) to about 91 m. Alternatively, rotor blades 100 may have any suitable length that enables the wind turbine 10 to function as described herein. For example, other non-limiting examples of blade lengths include 20 m or less, 37 m, 48.7 m, 50.2 m, 52.2 m or a length that is greater than 91 m. As wind strikes the rotor blades 100 from a wind direction 28, the rotor 18 is rotated about an axis of rotation 30. As the rotor blades 100 are rotated and subjected to centrifugal forces, the rotor blades 100 are also subjected to various forces and moments. As such, the rotor blades 100 may deflect and/or rotate from a neutral, or non-deflected, position to a deflected position.

Moreover, a pitch angle of the rotor blades 100, i.e., an angle that determines a perspective of the rotor blades 100 with respect to the wind direction, may be changed by a pitch system 32 to control the load and power generated by the wind turbine 10 by adjusting an angular position of at least one rotor blade 100 relative to wind vectors. Pitch axes 34 of rotor blades 100 are shown. During operation of the wind turbine 10, the pitch system 32 may change a pitch angle of the rotor blades 100 such that the rotor blades 100 are moved to a feathered position, such that the perspective of at least one rotor blade 100 relative to wind vectors provides a minimal surface area of the rotor blade 100 to be oriented towards the wind vectors, which facilitates reducing a rotational speed and/or facilitates a stall of the rotor 18.

In the exemplary embodiment, a blade pitch of each rotor blade 100 is controlled individually by a wind turbine controller 36 or by a pitch control system 80. Alternatively, the blade pitch for all rotor blades 100 may be controlled simultaneously by said control systems.

Further, in the exemplary embodiment, as the wind direction 28 changes, a yaw direction of the nacelle 16 may be rotated about a yaw axis 38 to position the rotor blades 100 with respect to wind direction 28.

In the exemplary embodiment, the wind turbine controller 36 is shown as being centralized within the nacelle 16, however, the wind turbine controller 36 may be a distributed system throughout the wind turbine 10, on the support system 14, within a wind farm, and/or at a remote control center. The wind turbine controller 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

Figure 2:
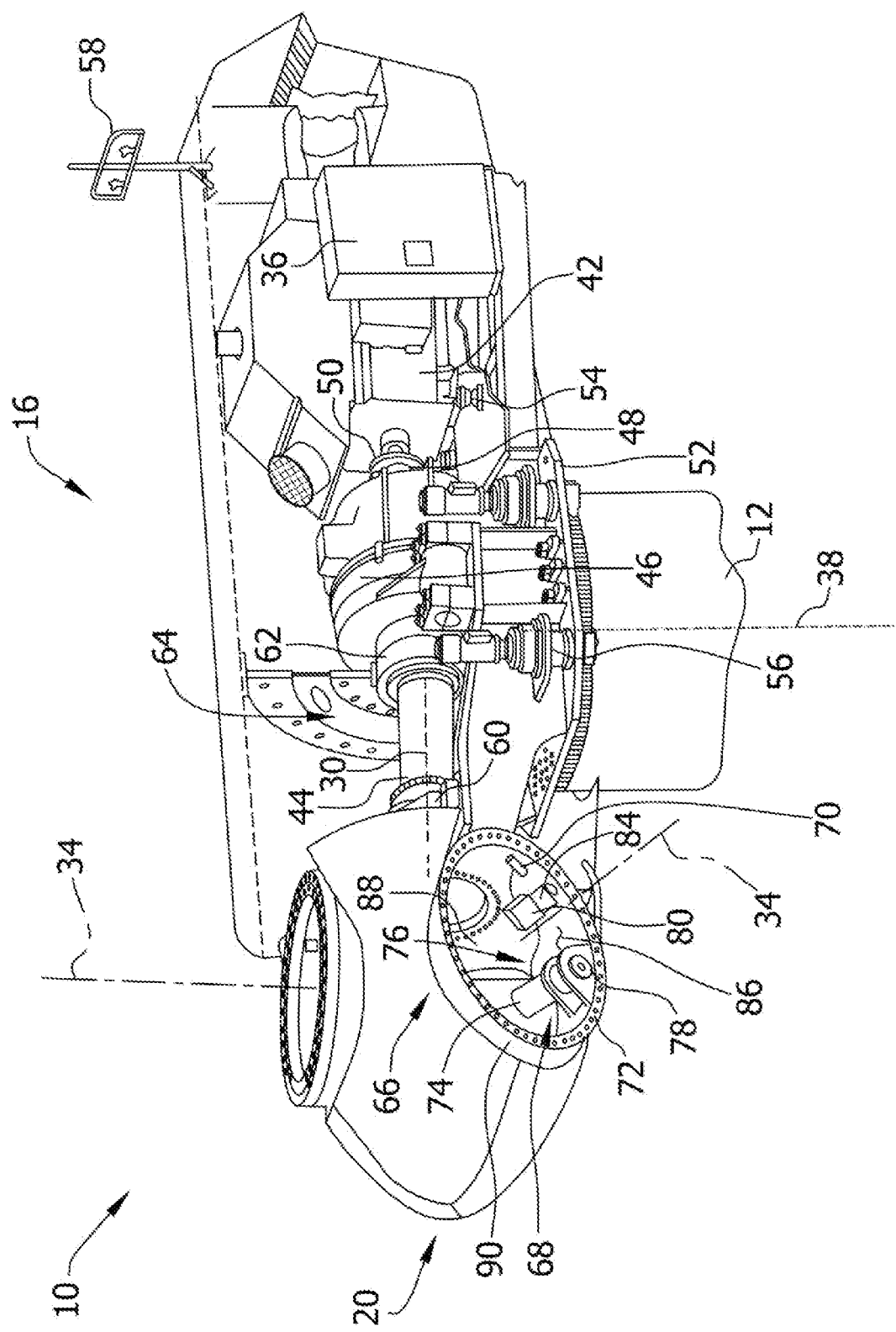
FIG. 2 illustrates a simplified, internal view of one embodiment of a nacelle of a wind turbine according to the present disclosure, particularly illustrating the nacelle during normal operation.

FIG. 2 is an enlarged sectional view of a portion of the wind turbine 10. In the exemplary embodiment, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high speed shaft 48, and a coupling 50. In the exemplary embodiment, the main shaft 44 is disposed at least partially coaxial to a longitudinal axis (not shown) of the nacelle 16. A rotation of the main shaft 44 drives the gearbox 46 that subsequently drives the high speed shaft 48 by translating the relatively slow rotational movement of the rotor 18 and of the main shaft 44 into a relatively fast rotational movement of the high speed shaft 48. The latter is connected to the generator 42 for generating electrical energy with the help of a coupling 50.

The gearbox 46 and generator 42 may be supported by a main support structure frame of the nacelle 16, optionally embodied as a main frame 52. The gearbox 46 may include a gearbox housing that is connected to the main frame 52 by one or more torque arms. In the exemplary embodiment, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Preferably, the main frame 52 is configured to carry the entire load caused by the weight of the rotor 18 and components of the nacelle 16 and by the wind and rotational loads, and furthermore, to introduce these loads into the tower 12 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

The nacelle 16 also may include a yaw drive mechanism 56 that may be used to rotate the nacelle 16 and thereby also the rotor 18 about the yaw axis 38 to control the perspective of the rotor blades 100 with respect to the wind direction 28.

For positioning the nacelle appropriately with respect to the wind direction 28, the nacelle 16 may also include at least one meteorological mast 58 that may include a wind vane and anemometer (neither shown in FIG. 2). The mast 58 provides information to the wind turbine controller 36 that may include wind direction and/or wind speed.

In the exemplary embodiment, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 100 (shown in FIG. 1) for modulating the pitch angel of a rotor blade 100 along the pitch axis 34. Only one of three pitch drive systems 68 is shown in FIG. 2.

In the exemplary embodiment, the pitch assembly 66 includes at least one pitch bearing 72 coupled to hub 20 and to a respective rotor blade 100 (shown in FIG. 1) for rotating the respective rotor blade 100 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 100 upon receipt of one or more signals from the wind turbine controller 36. In the exemplary embodiment, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servo-mechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 also includes one or more pitch control systems 80 for controlling the pitch drive system 68 according to control signals from the wind turbine controller 36, in case of specific prioritized situations and/or during rotor 18 overspeed. In the exemplary embodiment, the pitch assembly 66 includes at least one pitch control system 80 communicatively coupled to a respective pitch drive system 68 for controlling pitch drive system 68 independently from the wind turbine controller 36. In the exemplary embodiment, the pitch control system 80 is coupled to the pitch drive system 68 and to a sensor 70. During normal operation of the wind turbine 10, the wind turbine controller 36 controls the pitch drive system 68 to adjust a pitch angle of rotor blades 100.

In one embodiment, in particular when the rotor 18 operates at rotor overspeed, the pitch control system 80 overrides the wind turbine controller 36, such that the wind turbine controller 36 no longer controls the pitch control system 80 and the pitch drive system 68. Thus, the pitch control system 80 is able to make the pitch drive system 68 to move the rotor blade 100 to a feathered position for reducing a rotational speed of the rotor 18.

According to an embodiment, a power generator 84, for example comprising a battery and/or electric capacitors, is arranged at or within the hub 20 and is coupled to the sensor 70, the pitch control system 80, and to the pitch drive system 68 to provide a source of power to these components. In the exemplary embodiment, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the exemplary embodiment, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface 90 of hub 20 and may be coupled, directly or indirectly, to outer surface 90.

Figure 3:
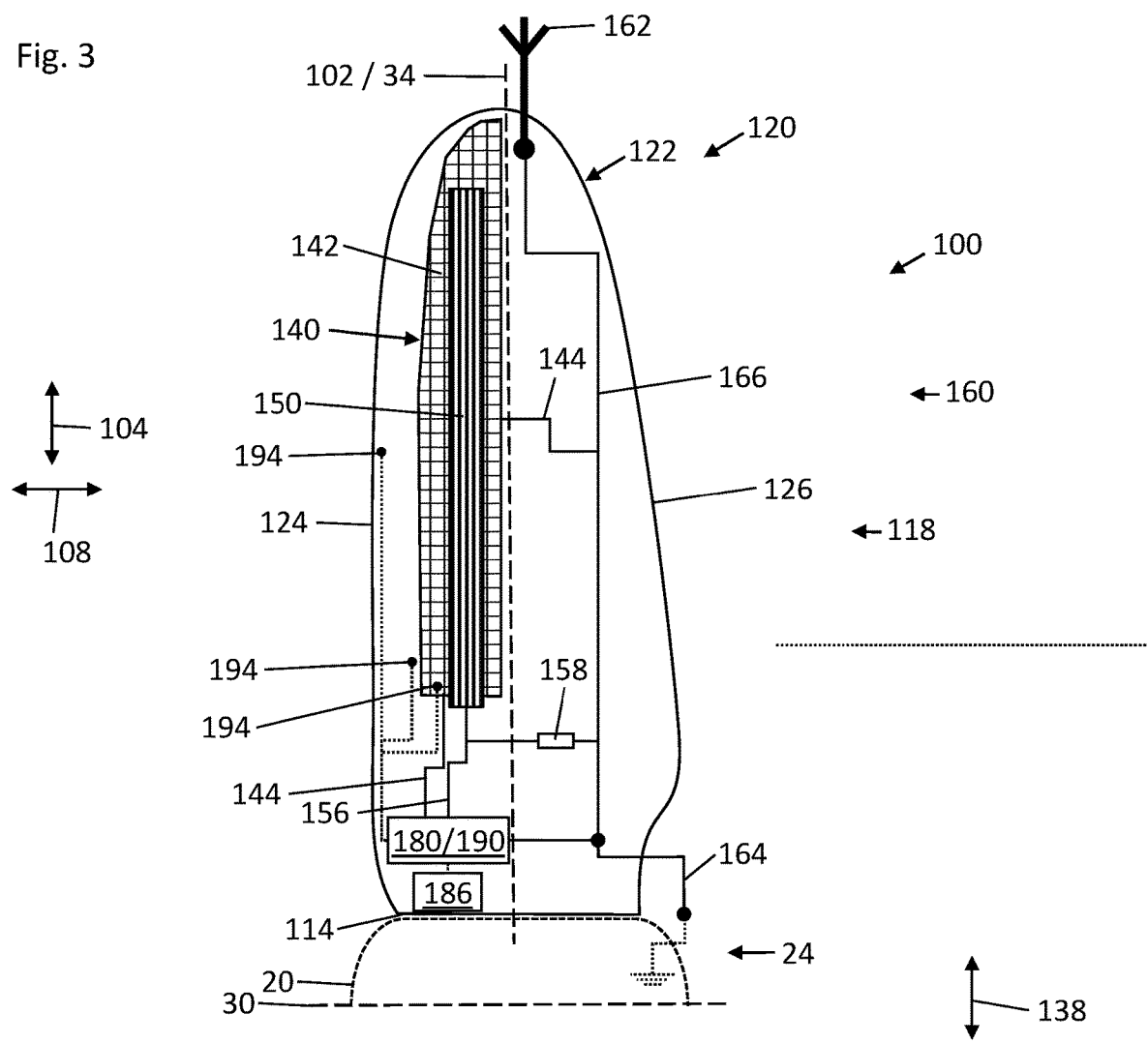
FIG. 3 schematically illustrates an embodiment of a rotor blade of a wind turbine of FIG. 1.

FIG. 3 is a non-limiting, schematic representation of a rotor blade 100 according to a specific embodiment, wherein a part of the hub 20 is shown by dashed lines. The entire rotor 18 comprising rotor blades 100 and the hub 20 is rotatable around the axis of rotation 30.

According to the representation of the subject matter of FIG. 3, the pitch axis 34 is identical to a longitudinal axis 102 of the rotor blade 100, wherein a longitudinal axis of a rotor blade may as well be different from the pitch axis, for example when having curved blades.

When describing the rotor blade 100, a longitudinal direction 104 is defined according to the longitudinal axis 102, and a chordwise direction 108 is determined according to a chord 106 of the rotor blade 100.

The rotor blade 100 can be structured in a tip section 120, a root section 110 and a middle section 118 connecting the root section 110 and the tip section 120. The rotor blade 100 comprises a blade root 112 in the root section 110, and a blade tip 122 in the tip section 120. The rotor blade 100 further comprises a suction surface and a pressure surface formed by a skin 130. The pressure surface and the suction surface are connected by a trailing edge 126 and a leading edge 124, both forming boundaries of the rotor blade surface in chordwise direction 108.

The rotor blade 100 comprises a lightning arrangement 160 for receiving lightning strikes and for conducting lightning energy into a grounding arrangement 24 of the wind turbine 10, a shielding arrangement 140 and an electric heating arrangement 150. The shielding arrangement 140 and the electric heating arrangement 150 are arranged in the skin 130 or directly at an inner or outer surface of the skin 130.

The lightning arrangement 160 may include one or a plurality of lightning receptors 162 for example being arranged in the tip section 120 and being configured for receiving lightning bolts during a lightning situation, and furthermore comprise at least a grounding device 164.

The grounding device 164 is configured for being capable of conducting electrical energy of a lightning strike into a grounding arrangement 24 of the wind turbine 10, wherein an electrical connection between the grounding device 164 and the grounding arrangement 24 may be chosen according to its suitability. For example such electrical connection may be provided by conductive means 166, for example comprising a suitable spark gap or arching arrangement.

Furthermore, a power source 180 and determination device 190 are provided, wherein the power source 180 and determination device 190 are electrically connected to the heating arrangement 150 and the shielding arrangement 140. The power source 180 and determination device 190 can be combined in one single technical component, wherein a controller 186 may be provided in order to control the power source 180 and/or the determination device 190. According to an embodiment, the determination device 190 can be a measurement device, which can be embodied as a specific component, which can be integrated in the power source 180 and/or in the controller 36 of the wind turbine.

The controller 186, the power source 180 and/or determination device 190 can be connected to at least one temperature sensor 194 by sensor connective means 192 (e.g. a cable), wherein the temperature sensor 194 can be arranged in the skin 180 and an area comprising the electric heating arrangement 150 or to an area not having the electric heating arrangement 150.

Figure 4:
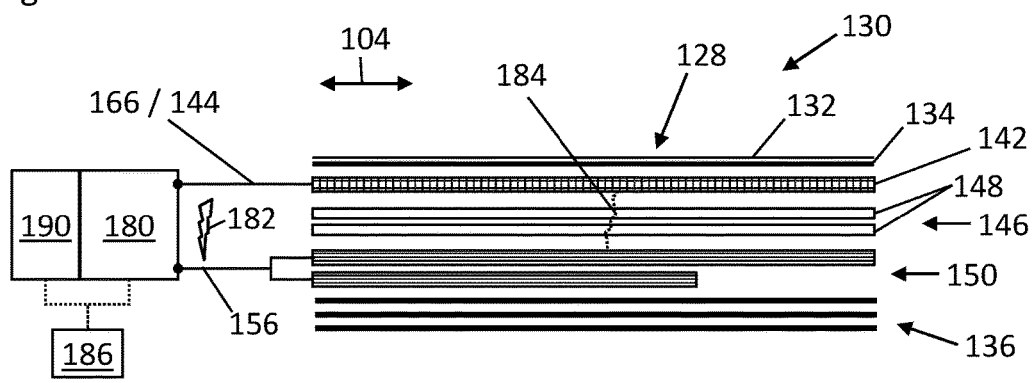
FIG. 4 is a schematic depiction of a configuration of the skin of the rotor blade of FIG. 3.

FIG. 4 is a schematic sectional illustration through the skin 130 of the rotor blade 100 showing a possible but not limiting configuration of layers of the skin 130. The inner surface of the skin 130 is at least partially formed by an inner layer 136. When moving towards the outer surface of the skin 130, the inner layer 136 are followed by a first heating layer 152 and a second heating layer 154 of the electric heating arrangement 150. The shielding arrangement 140 comprising a shielding layer 142 is electrically insulated with respect to the first heating layer 152 and the second heating layer 154 of the electric heating arrangement 150 by the help of the insulation arrangement 146 comprising at least one insulation layer 148. The outer surface of the skin 130 is formed by an outer layer 134 preferably sealed with respect to the environment by a gel coat 132.

The heating arrangement 150 is connected to the power source 180 by the heating conductor 156. For safety reasons is the heating arrangement 150 also connected to conductive means 166 of the lightning arrangement 160, wherein a surge protection device 158 is electrically provided between the conductive means 166 of the lightning arrangement 160 and the electric heating arrangement 150. Thus, in case an overvoltage situation is present in the electric heating arrangement 150, the surplus electric energy can be conducted via the surge protection device 158 into the lightning arrangement 160 in order to protect the power source 180 and/or the determination device 190.

In addition, the shielding arrangement 140 is electrically connected to the power source 180 and/or to the determination device 190 by the shielding conductor 144.

The power source 180 is configured for applying a predetermined amount of electric test- and/or maintenance-energy 182 such that the electric test- and/or maintenance-energy 182 is effectively present between the shielding arrangement 140 and the electric heating arrangement 150. For example, the electric test- and/or maintenance-energy 182 is provided to the shielding arrangement 140 and to the electric heating arrangement 150 such that as a consequence a shield-heating-voltage is applied effectively between the shielding arrangement 140 and the electric heating arrangement 150.

Furthermore, —if the skin 130 is in a suitable condition—, as a consequence of the provision of the electric test- and/or maintenance-energy 182, a shield-heating-current flows between the shielding arrangement 140 and the electric heating arrangement 150, or vice versa. Hence, the shield-heating-voltage and the shield-heating-current are caused by the provision of the predetermined electric test- and/or maintenance-energy 182.

The determination device 190 are electrically connected to the shielding arrangement 140 and to the electric heating arrangement 150 in a way that the shield-heating-voltage and/or the shield-heating-current being present between the shielding arrangement 140 and the electric heating arrangement 150 can be determined.

Figure 5:
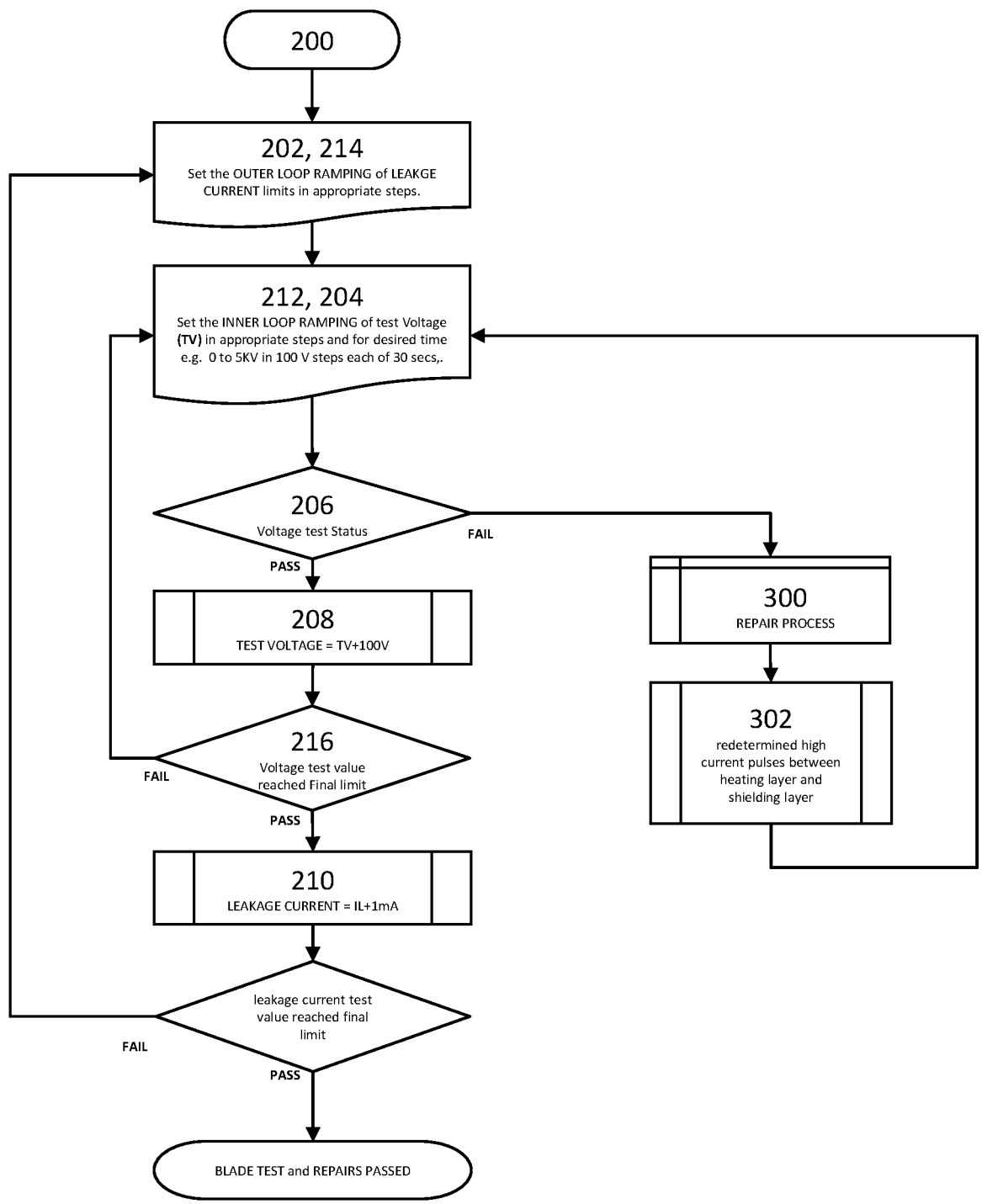
FIG. 5 is a flowchart describing the first operational embodiment and the second operational embodiment.

FIG. 5 is a schematic flow chart of the method for checking the functionality of the insulation arrangement 146 applying the test cycle and furthermore of the method for restoring the functionality of the insulation arrangement 146 applying the repair cycle 300.

The process may generally start by defining 202 a first shield-heating-current threshold, wherein the shield-heating-current threshold represents an accepted current leakage between the shielding arrangement 140 in the electric heating arrangement 150 during, in particular exclusively during, the execution of the test cycle. The test cycle can be performed in various iterations (loops). In particular, the shield-heating-current threshold is decreasing from each iteration to the subsequent iteration, for example starting with 10 mA, applying subsequently 5 mA, wherein after 1 mA is used as acceptable shield-heating-current threshold. According to an optional alternative, the shield-heating-current threshold is increasing from each iteration to the subsequent iteration, for example starting with 1 mA, applying subsequently 5 mA, wherein after 10 mA is used as acceptable shield-heating-current threshold.

In step 212 it is defined with what kind of test voltage (voltage ramp for the test voltage for loops of test cycles, for example increasing each loop from 0 (0.5) kV to 5 kV in steps of 100 V) and the first test voltage is applied. As a consequence of the application of the test voltage in step 212 a shield-heating-current between the shielding arrangement 140 and the electric heating arrangement 150 is established and determined by determination device 190. In step 206 it is analyzed if the shield-heating-current resulting of the application of the test voltage (first test voltage) does exceed the (first) shield-heating-current threshold as determined in step 202. If this is not the case the first loop of the test cycle has been passed successfully by the rotor blade (system).

Subsequently, the test voltage is increased 208 to its next higher value (second test voltage) and the test is conducted repeatedly in step 216. If the plurality of test voltages has been applied up to the maximum value of the test voltage and the test cycle has been passed successfully, the shield-heating-current threshold is increased to the second shield-heating-current threshold and the test cycle is conducted repeatedly applying the plurality of test voltages. Eventually, the test cycle has been passed successfully by the rotor blade if the determined shield-heating-current resulting from the highest test voltage is lower than acceptable shielding-heating-current threshold.

The repair cycle 300 can be applied is applied if the test cycle is not passed. For example, if it is determined in step 206 that the shield-heating-current exceeds the respective shield-heating-current threshold example it is determined by the controller 186 that an unacceptable conductivity 184 must be present between the shielding arrangement 140 and the electric heating arrangement 150. Therefore, the heating arrangement 150 and further components of the rotor blade 100 would not be sufficiently protected against overvoltage during a lightning strike. Therefore, the insulation functionality of the insulation arrangement 146 is to be improved, for example, by applying the repair cycle 300 (second operational embodiment).

During step 302 of the repair cycle 300 a specific amount and quality of a shield-heating-current (electric repair current) is provided between the shielding arrangement 140 and the electric heating arrangement 150 in order to pass through the conductivity 184. As a consequence, the conductivity 184 is heating up due to the electric repair current, which eventually may result in a deterioration of the conductivity 184. Said deterioration of the conductivity results in an increased insulating functionality for example due to a melting of the material of the rotor blade, an/or due to burning up the conductivity 184. Subsequently, the test cycle can be performed repeatedly in order to determine if the insulation arrangement 146 is working as required.

The skilled person is aware, that test cycle and repair cycle can be performed repeatedly and iteratively, for example, the electric repair current can be increased from a first electric repair current to a higher subsequent electric repair current if the test cycle 200 is not passed when having applied only a lower first electric repair current during the repair cycle 300.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art, for example that heating layer is 152, 154 and insulation layers 148 can be arranged differently than shown in FIG. 3. Such other examples are intended to be within the scope of the claims if they include elements that do not differ from the literal language of the claims, or if they include equivalent structural elements with insubstantial differences from the literal languages of the claims.

| REFERENCE NUMBERS | |
| --- | --- |
| 10 | wind turbine |
| 12 | tower |
| 14 | support system |
| 16 | nacelle |
| 18 | rotor |
| 20 | rotatable hub |
| 22 | hub transformer portion |
| 24 | grounding arrangement |
| 26 | load transfer regions |
| 28 | wind direction |
| 30 | axis of rotation |
| 32 | pitch system |
| 34 | pitch axes |
| 36 | controller of the wind turbine |
| 38 | yaw axis |
| 40 | processor |
| 42 | electric generator |
| 44 | main shaft |
| 46 | gearbox |
| 48 | high speed shaft |
| 50 | coupling |
| 52 | main frame |
| 54 | decoupling support means |
| 56 | yaw drive mechanism |
| 58 | meteorological mast |
| 60 | forward support bearing |
| 62 | aft support bearing |
| 64 | drive train |
| 66 | pitch assembly |
| 68 | pitch drive system |
| 70 | sensor |
| 72 | pitch bearing |
| 74 | pitch drive motor |
| 76 | pitch drive gearbox |
| 78 | pitch drive pinion |
| 80 | pitch control system |
| 84 | power generator |
| 100 | rotor blade |
| 102 | longitudinal axis |
| 104 | longitudinal direction |
| 106 | chord |
| 108 | chordwise direction |
| 110 | root section |
| 112 | blade root |
| 114 | root flange |
| 118 | middle section |
| 120 | tip section |
| 122 | blade tip |
| 124 | leading edge |
| 126 | trailing edge |
| 128 | fiber reinforced portion |
| 130 | skin |
| 132 | gel coat |
| 134 | outer layer |
| 136 | inner layer |
| 138 | thickness direction |
| 140 | shielding arrangement |
| 142 | shielding layer (copper mesh) |
| 144 | shielding conductor |
| 146 | insulation arrangement |
| 148 | insulation layer |
| 150 | electric heating arrangement |
| 152 | first heating layer |
| 154 | second heating layer |
| 156 | heating conductor |
| 158 | surge protection device |
| 160 | lightning arrangement |
| 162 | lightning receptor |

-continued

| REFERENCE NUMBERS | |
| --- | --- |
| 164 | grounding device |
| 166 | conductive means |
| 180 | power source |
| 182 | electric test- and/or maintenance-energy |
| 184 | conductivity |
| 186 | controller |
| 190 | determination device |
| 192 | sensor connective means |
| 194 | temperature sensor |
| 200 | test cycle |
| 202 | defining a shield-heating-current threshold |
| 204 | determining shield-heating-current |
| 206 | comparing determined shield-heating-current with shield-heating-current threshold |
| 208 | increasing test voltage |
| 210 | increasing shield-heating-current threshold |
| 212 | applying shield-heating-voltage |
| 214 | defining a test voltage threshold |
| 216 | final voltage test |
| 300 | reduction of conductivity (repair cycle) |
| 302 | establishing maintenance current |

The invention claimed is:

1. A structural system, comprising:
a structure prone to lightning strikes or icing;
a shielding arrangement electrically connected to a lightning arrangement;
an electric heating arrangement connected to a power source to mitigate icing of the structure;
an electrical insulation arrangement provided between the shielding arrangement and the electric heating arrangement;
the power source housed internally within the structure, the power source electrically connected to the shielding arrangement and to the heating arrangement to apply a predetermined amount of electric test or maintenance energy between the shielding arrangement and the electric heating arrangement; and
a determination device electrically connected to the shielding arrangement and to the electric heating arrangement and configured to determine a shield-heating-voltage or a shield-heating-current present between the shielding arrangement and the electric heating arrangement, wherein the shield-heating-voltage or the shield-heating-current are caused by provision of the predetermined electric test or maintenance energy.

2. The structural system according to claim 1, further comprising a controller configured to control the power source in accordance with one or more of:
the predetermined amount of electric test or maintenance energy is applied between the shielding arrangement and the electric heating arrangement;
the shield-heating-voltage is applied between the shielding arrangement and the electric heating arrangement while the shield-heating-current is limited to a threshold; and
a predetermined amount of the shield-heating-current is established between the shielding arrangement and the electric heating arrangement.

3. The structural system according to claim 1, wherein the lightning arrangement comprises a lightning receptor, a grounding device connectable with a grounding arrangement, and a conductor connecting the lightning receptor with the grounding device.

4. The structural system according to claim 1, wherein the structure comprises a rotor blade of a wind turbine or a portion of an aircraft.

5. The structural system according to claim 1, wherein:
the structure comprises a fiber reinforced skin portion defining an outer shape of the structure;
the fiber reinforced skin portion comprising an outer layer, an inner layer, an insulation layer as a component of the electric insulation arrangement, a shielding layer as a component of the shielding arrangement, and a heating layer as a component of the electric heating arrangement, the insulation layer arranged between the shielding layer and the heating layer;
the shielding layer, the insulation layer, and the heating layer arranged between the outer layer and the inner layer, and
the shielding layer arranged closer to the outer layer than the heating layer.

6. The structural system according to claim 5, wherein the insulation layer is made from a self-healing material.

7. A wind turbine, comprising:
a rotatable hub with a plurality of rotor blades, the rotatable hub connected to an electric generator;
at least one of the rotor blades comprising:
a shielding arrangement electrically connected to a lightning arrangement;
an electric heating arrangement connected to a power source;
an electrical insulation arrangement provided between the shielding arrangement and the electric heating arrangement;
the power source housed internally within the rotor blade, the power source electrically connected to the shielding arrangement and the electric heating arrangement to apply a predetermined amount of electric test or maintenance energy between the shielding arrangement and the electric heating arrangement;
a determination device electrically connected to the shielding arrangement and to the electric heating arrangement and configured to determine a shield-heating-voltage or a shield-heating-current present between the shielding arrangement and the electric heating arrangement, wherein the shield-heating-voltage or the shield-heating-current are caused by provision of the predetermined electric test or maintenance energy;
a controller configured to control the power source in accordance with one or more of:
the predetermined amount of electric test or maintenance energy is applied between the shielding arrangement and the electric heating arrangement;
the shield-heating-voltage is applied between the shielding arrangement and the electric heating arrangement while the shield-heating-current is limited to a threshold; and
a predetermined amount of the shield-heating-current is established between the shielding arrangement and the electric heating arrangement.

* * * * *